United States Patent [19]

van der Loos et al.

[11] 4,404,323

[45] Sep. 13, 1983

[54] POLYMER COMPOSITION OF α-METHYL STYRENE/ACRYLONITRILE COPOLYMER AND GRAFT COPOLYMER

[75] Inventors: Jozef L. M. van der Loos, Sittard; Jan Tijssen, Geleen, both of Netherlands

[73] Assignee: Stamicarbon, B.V., Geleen, Netherlands

[21] Appl. No.: 276,637

[22] Filed: Jun. 23, 1981

[30] Foreign Application Priority Data

Jul. 1, 1980 [NL] Netherlands ................... 8003799

[51] Int. Cl.$^3$ ................... C08L 51/04; C08L 25/16
[52] U.S. Cl. ................... 525/86; 525/75; 525/76; 525/85
[58] Field of Search ................... 525/86, 75, 76, 85

[56] References Cited

U.S. PATENT DOCUMENTS

3,010,936 11/1961 Irvin ................... 525/77
4,294,946 10/1981 Minematsu et al. ................... 526/80

FOREIGN PATENT DOCUMENTS

1390973 4/1975 United Kingdom.

OTHER PUBLICATIONS

Patent Abstracts of Japan—vol. 4, No. 124, p. 53C23 JP-A-55078043 (6-12-80)—Sumitomo.

Chem. Abstracts vol. 78, p. 57 137400K JP-A-72 34546 (72)—Sanyo.

Chem. Abstracts vol. 79, p. 48 6221a JP-A-73 07042—Sumitomo.

*Primary Examiner*—Carman J. Seccuro

[57] ABSTRACT

The invention relates to a heat resistant polymer composition based on one or more graft copolymers of styrene and acrylonitrile on a rubber and a copolymer of α-methylstyrene and acrylonitrile.

This composition comprises:

A. A graft copolymer obtained by polymerizing 50–80 parts by weight of a monomer mixture consisting of
  20–40% by weight of acrylonitrile,
  50–80% by weight of styrene and
  0–30% by weight of one or more other monomers
  in the presence of 20–50 parts by weight of rubber (in respect of 100 parts by weight of graft copolymer) and B. a copolymer of α-methylstyrene and acrylonitrile obtained by polymerizing a mixture of 60–80 parts by weight of α-methylstyrene and 20–40 parts by weight of acrylonitrile, of which copolymer the spiral flow length (S) is at least 65 and the flow index (V) 45 at most, and the ratio between spiral flow length and the flow index is at least 3.0, and in which polymer composition 35 to 80% by weight of copolymer of α-methylstyrene and acrylonitrile is present.

6 Claims, No Drawings

POLYMER COMPOSITION OF α-METHYL STYRENE/ACRYLONITRILE COPOLYMER AND GRAFT COPOLYMER

The invention relates to a thermoplastic polymer composition composed of one or more graft copolymers of styrene and acrylonitrile on a rubber, and a copolymer of α-methylstyrene and acrylonitrile (ABS polymers).

The invention also relates to molded products consisting wholly or partly of the thermoplastic polymer composition.

The name "ABS" is derived from the first letters of monomers of acrylonitrile, butadiene and styrene, from which the graft copolymers have in principle been prepared.

Thermoplastically moldable ABS polymers are heterogeneous plastics consisting of two phases. An elastic material, based in principle on polybutadiene, and/or butadiene copolymers, in the presence of which styrene and acrylonitrile have been polymerized, is dispersed as an internal discontinuous phase in a thermoplastic styrene-acrylonitrile copolymer as matrix (SAN matrix). In principle, saturated elastomeric components can also be used as the elastic material.

The physical properties of ABS polymers are in part only derived from the properties of the monomeric and/or polymeric components thereof. One of the most important properties, the impact resistance, is essentially determined by the two-phase structure formed by a rubber phase embedded in a hard, brittle, thermoplastic matrix.

For a number of applications, the heat resistance of these ABS polymers is, however, insufficient. This particularly concerns uses in the automobile industry, and in domestic and electrical appliances.

From a number of prior publications it is already known that complete or partial replacement of styrene by α-methylstyrene in ABS and/or SAN has a positive effect on the heat resistance.

From the U.S. Pat. No. 3,010,936 a polymer composition is already known based on a copolymer of α-methylstyrene and acrylonitrile, or a terpolymer of α-methylstyrene, styrene and acrylonitrile, mixed with a graft copolymer of styrene and acrylonitrile on a butadiene rubber.

With polymer compositions of the type considered in said patent specification the problem arises that, in order to reach a proper heat resistance, the copolymer or terpolymer content of the polymer composition must be rather high. However, this may give rise to problems because it will cause the impact resistance to fall to unacceptably low values. Moreover, the flow behavior of such polymer compositions is very poor.

From U.S. Pat. No. 3,111,501 it is already known how to make a polymer composition consisting for 68–85% of a copolymer of α-methylstyrene and acrylonitrile with 32–15% of a graft copolymer of 40–50 parts by weight of styrene and acrylonitrile with 50–60 parts by weight of polybutadiene. Such a polymer composition also has the disadvantage that its flow behavior is very poor, which is caused by the high rubber content of the graft copolymer and the high percentage of copolymer with a poor flow.

In the British patent specification No. 1,390,973 mixtures of ABS, SAN and a copolymer of α-methylstyrene and acrylonitrile are described. According to this patent specification, it is possible to overcome the problems which occur in respect of the flow behavior of a mixture of ABS and a copolymer of α-methylstyrene and acrylonitrile by adding SAN to this mixture. While, indeed, an improvement of the flow behavior is thus obtained, it yet remains rather poor, and the gain is at the expense of the heat resistance and the impact resistance of the resulting polymer composition.

The purpose of the present invention is to provide a polymer composition of the nature described in which the combined properties of good heat resistance, also a very good flow behavior and a very good impact resistance are present.

The polymer composition according to this invention is characterized in that the polymer composition comprises:

A. A graft copolymer obtained by polymerizing 50–80 parts by weight of a monomer mixture consisting of
  20 to 40% by weight of acrylonitrile,
  50 to 80% by weight of styrene, and
  0 to 30% by weight of one or more other monomers
in the presence of 20 to 50 parts by weight of rubber (with respect to 100 parts by weight of graft copolymer), and B. A copolymer of α-methylstyrene and acrylonitrile obtained by polymerizing a mixture of 50 to 80 parts by weight of α-methylstyrene and 20 to 40 parts by weight of acrylonitrile,
  in which copolymer the spiral flow length (S) is at least 65 and the flow index (V) is at most 45, and with a ratio of at least 3 between spiral flow length, and flow index,
and which polymer composition
  contains from 35 to 80% by weight of said copolymer (B).

The quantity of rubber in the graft copolymer (A) preferably amounts to 25 to 40 parts by weight, while the copolymer (B) content of the composition is preferably less than 65%.

Preferably, the spiral flow length of the copolymer (B) is at least 70 cm.

The flow index of the copolymer (B) is preferably at least 12.5. The fact is that with lower values of the flow index, it will be virtually impossible to obtain the correct value for the spiral flow length of the copolymer.

More specifically, the preferred upper limit of the flow index of the copolymer is generally 25.

Optimum results with respect to heat resistance, processing behavior and mechanical properties are obtained if the ratio (S/V) of spiral flow length/flow index of the copolymer is at least 3.5.

Flow index (V) is understood to mean the quantity of polymer flowing out of a capillary of a diameter of 1 mm and a length of 2 mm at 230° C., and under a pressure of 30 bar, expressed in $10^{-9}$ m$^3$/s (see also British patent specification No. 1,500,525).

The spiral flow length (S) is, in this connection, the distance which a polymer melt, with a temperature of 260° C. on entry of the mold, covers, under an initial pressure of 742 bar, in a mold kept at 50° C., which mold has ducts of a width of 20 mm and a thickness of 3 mm (flat spiral length: H. Ebneth, K. Bohm, Plastverarbeiter, 19 (1968), pages 261–269).

Surprisingly, it has been found that the polymer composition according to the invention combines a very good heat resistance with a good flow behavior, impact resistance, flexural strength and tensile strength. On the basis of the quantity of copolymer of α-methylstyrene and acrylonitrile present, it might be expected that particularly the impact resistance, the flexural strength and the flow behavior of the polymer composition would not to be satisfactory. It has been found, however, that the combination of the rubber content of the graft copolymer on the one hand and the stated values for the spiral flow length, the flow index and the ratio thereof on the other produces a polymer composition of an optimum quality in respect of the various properties.

The described polymer composition is preferably such that its rubber content is between 10 and 30% by weight, more specifically between 10 and 20% by weight. Within these limits of the rubber content, a polymer composition is obtained which has a good impact resistance combined with good processability.

Suitable comonomers for incorporation in the graft copolymer include halogenated styrene, vinylacetate, maleic anhydride, methyl-methacrylate, and α-methylstyrene.

Preferably, a graft copolymer is employed which is obtained by polymerizing styrene and acrylonitrile in the presence of a rubber.

For this purpose, the various polymerization techniques known in the art, such as emulsion-, suspension-, mass- and solution-polymerization, or combinations thereof, such as mass-suspension-, emulsion-mass, and emulsion-suspension polymerization, are suitable.

The preparation of the copolymer of α-methylstyrene and acrylonitrile is preferably carried out in an emulsion, but it is also possible to employ other polymerization techniques to obtain products which comply with the requirements of flow index and spiral flow length.

For both the graft copolymer and the copolymer of α-methylstyrene and acrylonitrile, the usual techniques may be employed for an emulsion polymerization.

In the event polymerization in aqueous emulsion is employed, the usual auxiliary materials required for this purpose should be utilized, such as emulsifiers, lye, salts, soaps, initiators such as peroxides, and chain length regulators.

Suitable chain length regulators are organosulphur compounds, such as the much used mercaptans, as well as the dialkyl dixanthogens, diarylsulphides, mercapto thiazoles, tetraalkylthiuram mono- and disulphides, etc., separately or mixed with each other, as well as hydroxyl compounds, such as terpinolenes. Further, the dimer of α-methylstyrene or an α-alkene with a relatively long chain can also be used.

The commercially most widely used chain length regulators are particularly the mercapto compounds, and of these the hydrocarbyl mercaptans with 8 to 20 carbon atoms per molecule are now much used. More specifically, preference is given to mercaptans with a tertiary alkyl group.

The quantity of organosulphur compound utilized may vary within wide limits, depending on the mixture chosen, the specific compound, polymerization temperature, emulsifier and other variables relating to the recipe. A good result can be achieved by using from 0.01 to 5 parts by weight, preferably 0.05 to 2 parts by weight, (per 100 parts by weight of monomer) of organosulphur compound. Suitable organosulphur compounds comprise n-octyl mercaptan, n-dodecyl mercaptan, tertiary dodecyl mercaptan, tertiary nonyl mercaptan, tertiary hexadecyl mercaptan, tertiary octadecyl mercaptan, tertiary eicosyl mercaptan, secondary octyl mercaptan, secondary tridecyl mercaptan, cyclododecyl mercaptan, cyclododecadienyl mercaptan, aryl mercaptan, such as 1-naphthalene thiol, etc., bis(tetrahydrofuralxanthogen), diphenyldisulphide, bis(tetramethylthiuram disulphide), 2-mercaptobenzathiazole and the like. Mixtures of these compounds can also be used.

As emulsifier, widely different compounds can be used, such as disproportionated rosin soaps, fatty acid soaps, aryl sulphonates, alkylaryl sulphonates and other surface-active compounds and mixtures thereof. Nonionogenic emulsifiers, such as polyethers and polyols, can also be used. The quantities of emulsifiers used depend on the type of emulsifier, as well as on the reaction parameters and the concentrations of polymerizable monomer in the emulsion polymerization system.

Suitable compounds yielding free radicals are, for the emulsion polymerization process, organic or inorganic peroxides, hydroperoxides, and azo compounds, as well as redox initiator systems. These compounds can be added at the beginning of the polymerization process or they may be added partly at the beginning and partly during the course of the polymerization process.

Preferably, alkali or ammonium persalts and/or redox systems are chosen as initiators. Particularly, potassium persulphate, ammonium persulphate and sodium persulphate must be mentioned. Examples of suitable redox systems include persalts (for instance, perchlorates or persulphates), tertiary butyl hydroperoxide, cumene hydroperoxide, diisopropylbenzenehydroperoxide and methylcyclohexylhydroperoxide, combined with reductants based on acids containing sulphur in a low valence state, such as sodiumformaldehydesulphoxylate, bisulphide, pyrosulphide, or combined with organic bases, such as triethanolamine, with dextrose, sodium pyrophosphate and mercaptans or combinations thereof, optionally in combination with metal salts, such as ferrous sulphate. These initiators or initiator systems can be added in one or more steps or even gradually.

In those cases in which α-methylstyrene-acrylonitrile copolymers are prepared by means of suspension polymerization, it is possible to employ the usual suspension stabilizers, for instance, polyvinyl alcohol or partially hydrolyzed polyvinyl acetate, as well as hardly soluble metal phosphates.

As already indicated, preference is given to emulsion polymerization, because with this process, compared to, for instance, mass or solution polymerization, a copolymer of α-methylstyrene and acrylonitrile complying with the stated requirements can be obtained in a relatively simple manner.

In the preparation of the copolymer in emulsion it will generally suffice to adjust the consumption pattern of the chain length regulator by, among other things, variation of the stirring pattern, respectively, adjustment of the stirring speed, in which adjustment a lower stirring speed will result in an increase of the S/V. Of course, a minimum stirring speed is necessary to obtain and maintain a proper dispersion.

This pattern may also be influenced by reducing the pH to a value lower than 11 or by reducing the concentration of the chain length regulator in the beginning of the polymerization process, as well as by applying an adjusted temperature profile.

In addition to these possibilities, to obtain the desired spiral flow length, flow index and S/V ratio, the manner of monomer addition may be adjusted as well, or extra initiator may be added after commencement of the polymerization process. In addition, it is possible to add the chain length regulator only after polymerization reaction has been going on for some time. It is also possible to apply combinations of two or more of the said measures.

Another possibility to make a copolymer of α-methylstyrene and acrylonitrile with the desired properties is by the adjustment of the polymerization process in such a manner that a molecular weight distribution with two or more peaks is obtained, or by the combination of two polymerization processes.

If desired, the copolymer may also contain minor quantities of one or more other monomers. These quantities must be smaller than 4% by weight in respect of the copolymer, more specifically smaller than 2% by weight.

A description of a copolymer which can be used in the polymer composition as component B has been given in the U.S. patent application Ser. No. 393,734 filed simultaneously herewith, the disclosure of which is incorporated herein by reference.

All rubbers are suitable, in principle, for the preparation of the graft copolymer.

Preference is given to rubbers based on butadiene, such as polybutadiene and butadiene-styrene rubber. In order to obtain a polymer composition with a good impact resistance, a rubber latex is preferably used which has a weight-average particle size ($d_{50}$, determined with electron microscope) of between 0.05 and 0.70 μm is preferably started from.

This accordingly means that in such a case the preparation of the graft copolymer is carried out at least partly in emulsion.

The process according to which this rubber latex is prepared is preferably regulated in such a manner that highly cross-linked products are obtained. The gel content should preferably be higher than 70% by weight (as determined in methylethylketone or toluene). With a high butadiene content, this degree of cross-linking can be obtained by polymerizing to high degrees of conversion, or by using polyfunctional monomers cross-linking agents, such as divinylbenzene or ethyleneglycoldimethacrylate.

If for the graft copolymerization use is not made of an emulsion polymerization, rubbers made from solutions thereof in organic solvents can also be employed. In such a case, however, it is desirable to carry out the graft polymerization reaction, for instance, in the form of a mass-suspension polymerization reaction.

In those cases in which the rubbers are prepared by emulsion polymerization, the emulsifiers, activators and polymerization auxiliaries used for the preparation of the α-methylstyrene-acrylonitrile copolymers can be used. Prior to the grafting reaction, the rubber latex must be degassed in order to suppress undesired cross-linking reactions initiated by non-converted monomer.

Preference is given to the use of polybutadiene-homopolymers or butadiene-copolymers with a butadiene content of more than 60% by weight. If other dienes, for instance isoprene, or the lower alkyl esters or acrylic acid, are used as comonomers, the butadiene content of the rubber can be reduced to 30% by weight without any disadvantage occurring in respect of the properties of the polymer composition. In principle, it is also possible to prepare the graft polymer according to the invention from saturated rubbers, for instance, from ethylenevinylacetate copolymers with a vinylacetate content lower than 50%, or from ethylene-propylene-diene terpolymers (these dienes are not conjugated). Examples include 1.4 hexadiene, ethylidene norbornene, dicyclopentadiene), as well as acrylate rubber, chlorinated polyethylene or chloroprene rubber. Mixtures of two or more rubbers can also be applied.

The polymer composition may generally contain the usual additives, such as antioxidants, pigments, processing aids, fillers, antistatics, flame retardants and the like. At the same time, another polymer may be incorporated in the composition, such as polyphenylene oxide, polycarbonate, polysulphone and the like.

In general, the desired results in the practice of this invention will be realised using compositions wherein the afore said spiral flow length is at most 200, the flow index at least 7.5 and the S/V ratio at most 25.

Finally, the invention also relates to an object wholly or partly made from the polymer composition described above.

The invention will now be elucidated by means of the following example without being restricted thereto.

EXAMPLES I UP TO AND INCLUDING IV

On the basis of two general purpose ABS graft copolymers consisting of polybutadiene with styrene and acrylonitrile grafted thereon in a weight ratio of 70/30 and various copolymers of α-methylstyrene and acrylonitrile, a number of polymer compositions were prepared. The graft copolymers used had the following properties:

TABLE 1

| Graft Copolymers | % Rubber | Izod (KJ/m$^2$) | HDT (°C.) (temp.) | Flow Index ($10^{-9}$ m$^3$/s) | Spiral Flow Length (cm) |
|---|---|---|---|---|---|
| A | 25 | 44 | 96 | 7 | 68 |
| B | 38 | 47 | 94 | 2 | 55 |

The properties of the various copolymers of α-methylstyrene and acrylonitrile were as follows:

TABLE 2

| Co-polymer | Bending Strength N/mm | HDT °C. (tempered) | Flow Index | Spiral Flow Length | S/V |
|---|---|---|---|---|---|
| 1 | 131 | 117 | 16 | 75 | 4.7 |
| 2 | 122 | 116 | 21 | 82 | 3.9 |
| 3 | 135 | 118 | 15 | 71 | 4.7 |
| 4 | 140 | 117 | 15 | 76 | 5.1 |
| 5 | 140 | 118 | 14 | 75 | 5.4 |
| 6 | 76 | 116 | 17 | 49 | 2.9 |
| 7 | 109 | 117 | 30 | 78 | 2.6 |
| 8 | 58 | 117 | 56 | —[1] | — |
| 9 | 151 | 106[2] | —[1] | 35 | — |
| 10 | 143 | 118 | 19 | 55 | 2.9 |

[1]Not determined.
[2]This product contained approximately 2 weight % of free monomers.

From these graft copolymers and copolymers, a number of polymer compositions were made. In the Table, a letter and a figure successively indicate, under "polymer composition", the combination of the respective graft copolymer and copolymer. Thus, A-5 means a polymer composition consisting of graft copolymer A and copolymer 5.

In the following column, the weight ratio of graft copolymer-copolymer is given under "composition", where the sum of the two weights works out at 100. 40/60 consequently means a polymer composition consisting of 40 parts by weight of graft copolymer and 60 parts by weight of copolymer.

TABLE 3

| Example | Polymer Comp. | Composition | HDT °C. (tempered) | Izod N/mm² | Spiral Flow Length (Polymer Composition) cm |
| --- | --- | --- | --- | --- | --- |
| I | A-1 | 50/50 | 106 | 20.2 | 72 |
| II | A-2 | 50/50 | 105 | 16.5 | 75 |
| III | A-3 | 50/50 | 107 | 18.5 | 70 |
| IV* | A-6 | 50/50 | 105 | 8.1 | 55 |
| V* | A-7 | 50/50 | 105 | 10.4 | 71 |
| VI | A-2 | 40/60 | 108 | 10.6 | 77 |
| VII | B-2 | 40/60 | 107 | 15.2 | 74 |
| VIII | B-3 | 40/60 | 110 | 17.1 | 67 |
| IX | B-4 | 40/60 | 109 | 18.4 | 70 |
| X | B-5 | 40/60 | 110 | 17.3 | 70 |
| XI | B-2 | 50/50 | 105 | 25.6 | 72 |
| XII* | B-6 | 50/50 | 105 | 8.0 | 50 |
| XIII* | B-7 | 40/60 | 108 | 10.1 | 67 |
| XIV* | B-8 | 40/60 | 108 | 5.3 | 87 |
| XV* | B-9 | 40/60 | 106 | 16.7 | 40 |
| XVI* | B-10 | 40/60 | 109 | 15.5 | 55 |

*Not according to the invention.

The above Examples clearly show that polymer compositions according to the invention starting from a copolymer with the correct values for the flow index, spiral flow length and the ratio thereof have substantially better properties than polymer compositions which are not according to the invention.

What is claimed is:

1. A polymer composition composed of one or more graft copolymers of styrene and acrylonitrile on a rubber and a copolymer of α-methylstyrene and acrylonitrile, wherein the composition consists essentially of:
   A. a graft copolymer obtained by polymerizing 50 to 80 parts by weight of
       20 to 40% by weight of acrylonitrile,
       50 to 80% by weight of styrene, and
       0 to 30% by weight of one or more other monomers
   in the presence of 20 to 50 parts by weight of rubber (with respect to 100 parts by weight of graft copolymer), and
   B. a copolymer of α-methylstyrene and acrylonitrile obtained by polymerizing a mixture of 60–80 parts by weight of α-methylstyrene and 20–40 parts by weight of acrylonitrile, of which copolymer the spiral flow length (S) is at least 65 and the flow index (V) at most 45, and the ratio between spiral flow length and the flow index is at least 3.0,
   and in which polymer composition 35 to 80% by weight of copolymer (B) of α-methylstyrene and acrylonitrile is present.

2. Polymer composition according to claim 1, wherein in the copolymer B the ratio between spiral flow length and flow index is at least 3.5.

3. Polymer composition according to either one of claims 1 or 2, wherein the rubber is chosen from the group of polybutadiene, butadiene-styrene-rubber, acrylate rubber, butadiene-acrylonitrile rubber, EPT and polychloroprene.

4. Polymer composition according to any one of claims 1, 2 or 3, wherein the rubber content of the composition is between 10 and 30% by weight, more specifically between 10 and 20% by weight.

5. Polymer composition according to any one of claims 1, 2, 3 or 4, wherein the flow index of the copolymer of α-methylstyrene and acrylonitrile is at least 12.5.

6. Polymer composition according to any one of claims 1, 2, 3, 4 or 5, wherein the spiral flow length of the copolymer is at least 70.

* * * * *